(12) United States Patent
Doll (10) Patent No.: US 6,241,618 B1
(45) Date of Patent: Jun. 5, 2001

(54) ADJUSTABLE ROTATING SHAFT GUARD

(76) Inventor: Ronald J. Doll, 2237 Washington Ave., Cedarburg, WI (US) 53012

( * ) Notice: Subject to any disclaimer, the term of this patent is extended or adjusted under 35 U.S.C. 154(b) by 0 days.

(21) Appl. No.: 09/439,513

(22) Filed: Nov. 12, 1999

(51) Int. Cl.$^7$ .................................................. F16C 1/26
(52) U.S. Cl. ............................ 464/176; 464/170; 74/609
(58) Field of Search ................................... 464/170, 176; 417/360; 220/4.28, 252; 74/609; 52/DIG. 14; 285/47; 138/157, 158, 159

(56) References Cited

U.S. PATENT DOCUMENTS

| | | | |
|---|---|---|---|
| D. 244,020 | * | 4/1977 | Hanson et al. . |
| 600,375 | * | 3/1898 | Podeyn .................................. 464/170 |
| 773,945 | * | 11/1904 | Kronauer .............................. 138/158 |
| 1,232,953 | | 7/1917 | Mills . |
| 1,531,285 | | 3/1925 | Hodgkinson . |
| 1,665,241 | * | 4/1928 | Weiss .................................. 464/170 X |
| 1,814,134 | * | 7/1931 | Eige ..................................... 285/47 X |
| 2,512,528 | * | 6/1950 | Holman ................................ 74/609 X |
| 2,858,115 | * | 10/1958 | Stebbins ................................ 138/159 |
| 4,211,519 | * | 7/1980 | Hogan ................................... 417/360 |
| 4,324,533 | * | 4/1982 | Schroeder et al. ................. 464/170 X |
| 4,840,194 | * | 6/1989 | Berry .................................... 138/159 |
| 5,259,410 | * | 11/1993 | Trueb et al. ........................ 285/47 X |
| 5,643,181 | * | 7/1997 | Lin . |
| 5,674,052 | * | 10/1997 | Berra . |
| 5,711,170 | | 1/1998 | Brisk .................................... 464/170 |
| 6,190,261 | * | 2/2001 | Powell ................................. 464/170 |

* cited by examiner

*Primary Examiner*—Lynne H. Browne
*Assistant Examiner*—Greg Binda
(74) *Attorney, Agent, or Firm*—Donald J. Ersler (57) ABSTRACT

An adjustable rotating shaft guard includes a base, a first guard half, and a second guard half. A bottom of the first and second guard halves are retained by the base such that they contact each other to fully cover a rotating shaft or coupler. A half sleeve preferably extends outward from at least one end of the first and second guard halves. Preferably, the top of each guard half is fastened to each other. The first and second guard halves are preferably fabricated from a high impact plastic. The bottom area of the first and second guard halves preferably have a plurality of cutting lines which provide a reference for sawing to a specific height. The half sleeves also have a plurality of cutting lines which provide a reference for sawing to a specific length. In a second embodiment, an adjustable rotating shaft guard includes a first sleeve guard half, a second sleeve guard half and two sets of two end cap halves. Each pair of end cap halves are attached to each end of the first and second sleeve guard halves. One or both ends of the first and second sleeve halves may be supported by an adjustable leg set. One or both ends of the first and second sleeve guard halves may be supported by a mounting plate.

28 Claims, 6 Drawing Sheets

ADJUSTABLE ROTATING SHAFT GUARD

BACKGROUND OF THE INVENTION

1. Field of the Invention

The present invention relates generally to guards for rotating machinery and more specifically to an adjustable rotating shaft guard which may be modified to accommodate different shaft heights and lengths.

2. Discussion of the Prior Art

A problem frequently encountered with shielding rotating shafts is the lack of a universal guard which may be adapted to cover a variety of rotating shaft set-ups. Most guards are custom made specifically for a particular piece of machinery. Building custom guards is both time consuming and expensive, since a maintenance worker must use many hours to fabricate the guard and then install it. Further, many guards once installed are not easily removable. Guards must be periodically removed to replace a coupler, clutch, or to provide maintenance to a machine.

Accordingly, there is a clearly felt need in the art for an adjustable rotating shaft guard which may be modified to fit different machine set-ups and which provides efficient access for maintenance.

SUMMARY OF THE INVENTION

The primary objective of the present invention is to provide an adjustable rotating shaft guard which may be modified to fit different machine set-ups and which provides efficient access for maintenance.

According to the present invention, an adjustable rotating shaft guard includes a first guard half, and a second guard half. The first and second guard halves are attached to some type of base, such as a pedestal, a foundation, or a machine. The pedestals are preferably available in various heights. The first and second guard halves are retained by the base such that they contact each other to fully cover a rotating shaft or coupler. A half sleeve preferably extends outward from at least one end of the first and second guard halves. Preferably, the top of each guard half is fastened to each other. The first and second guard halves are preferably fabricated from a high impact plastic. The bottom area of the first and second guard halves preferably have a plurality of cutting lines which provide a reference for sawing to a specific height. The half sleeves also have a plurality of cutting lines which provide a reference for sawing to a specific length.

In a second embodiment, an adjustable rotating shaft guard includes a first sleeve guard half, a second sleeve guard half and two sets of two end cap halves. A flange extends outward from each side of the first and second sleeve guard halves. The flanges of the first and second sleeve halves are fastened to each other. Each pair of end cap halves are attached to each end of the first and second sleeve guard halves. One or both ends of the first and second sleeve halves may be supported by an adjustable leg set. One or both ends of the first and second sleeve guard halves may be supported by a mounting plate. The first sleeve guard half, the second sleeve guard half, and the pair of end cap halves are preferably fabricated from a high impact plastic. The ends of the first and second sleeve guard halves preferably have a plurality of cutting lines which provide a reference for sawing to a specific length.

Accordingly, it is an object of the present invention to provide an adjustable rotating shaft guard which may be adjusted to different lengths and heights to accommodate different machine setups.

It is a further object of the present invention to provide an adjustable rotating shaft guard which is fabricated of a high impact plastic.

It is yet a further object of the present invention to provide an adjustable rotating shaft guard which may be fastened to existing machinery without requiring a pedestal.

Finally, it is another object of the present invention to provide an adjustable rotating shaft guard which may be efficiently removed for maintenance purposes.

These and additional objects, advantages, features and benefits of the present invention will become apparent from the following specification.

DETAILED DESCRIPTION OF THE PREFERRED EMBODIMENTS

Figure 1:
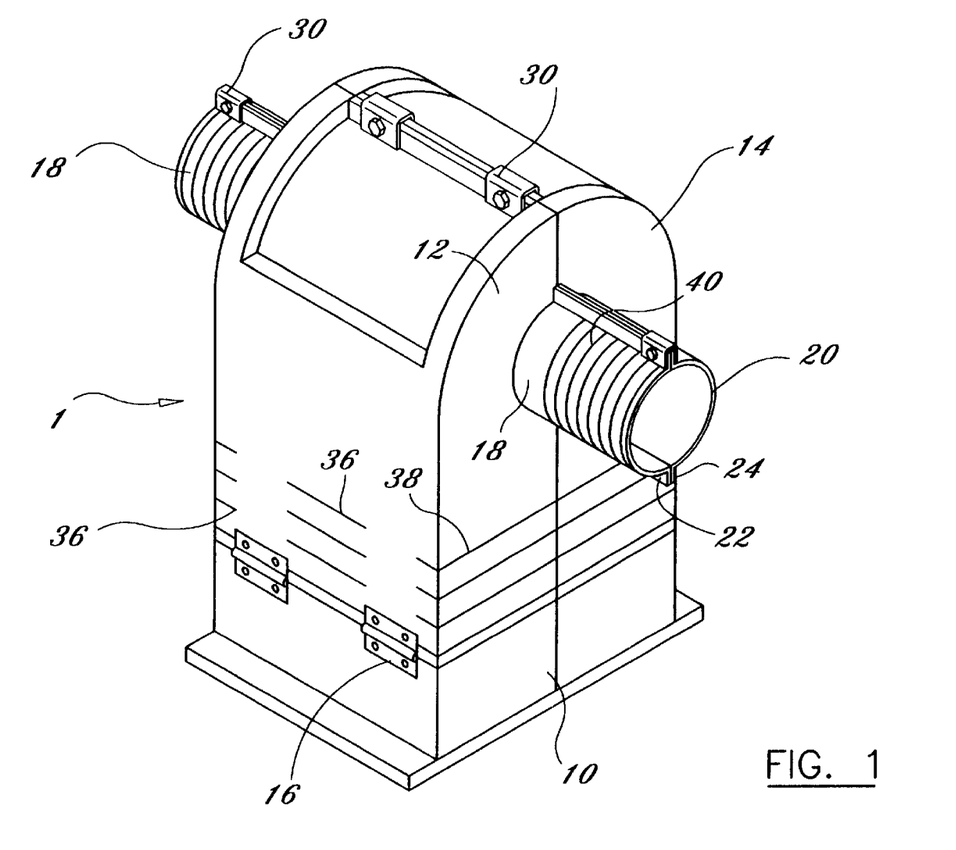
FIG. 1 is a perspective view of an adjustable rotating shaft guard in accordance with the present invention.
Figure 2:
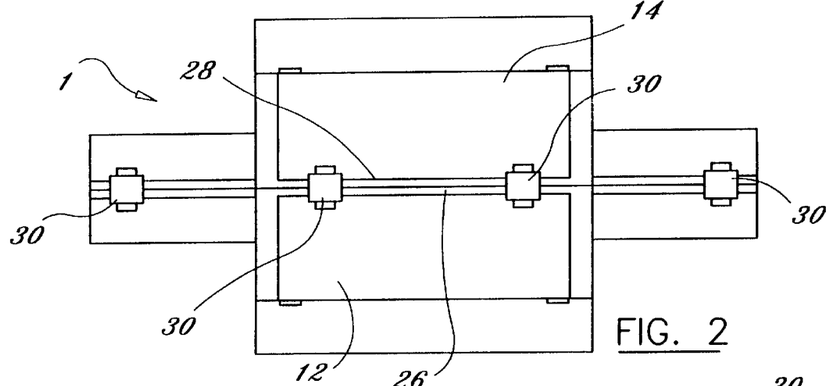
FIG. 2 is a top view of an adjustable rotating shaft guard in accordance with the present invention.
Figure 3:
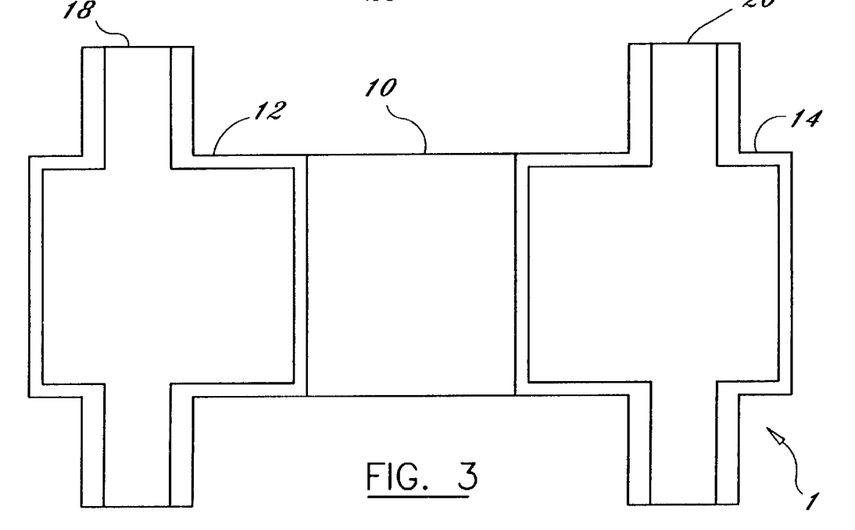
FIG. 3 is a top view of an adjustable rotating shaft guard with the guard halves folded out in accordance with the present invention.
Figure 4:
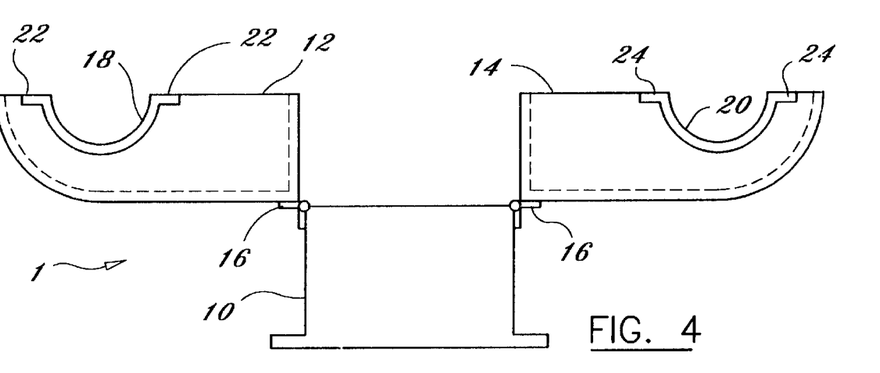
FIG. 4 is a front view of an adjustable rotating shaft guard with the guard halves folded out in accordance with the present invention.
Figure 4A:
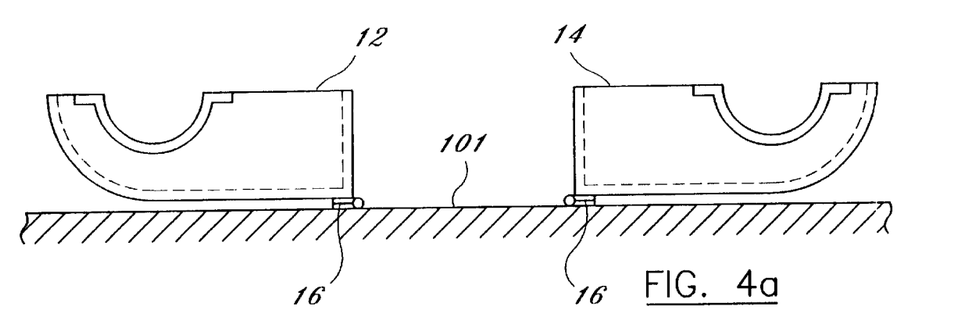
FIG. 4a is a front view of an adjustable rotating shaft guard with the guard halves folded out and pivotally attached to a foundation in accordance with the present invention.
Figure 5:
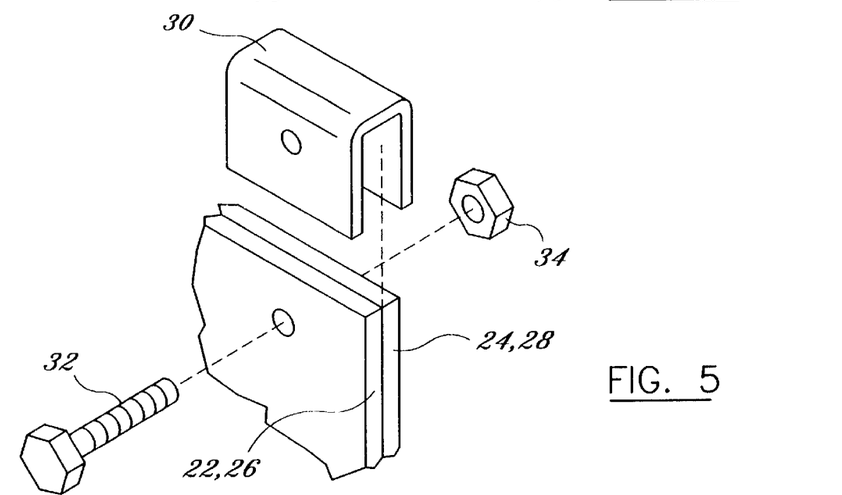
FIG. 5 is an enlarged perspective view of a retention clip, bolt, and nut before assembly of the two guard halves in accordance with the present invention.

With reference now to the drawings, and particularly to FIG. 1, there is shown a perspective view of an adjustable rotating shaft guard 1. With reference to FIGS. 2–4a, the adjustable rotating shaft guard 1 includes a first guard half 12 and a second guard half 14. The first and second guard halves may be attached to a pedestal 10, a foundation 101, or a machine. The pedestal 10 is preferably available in various heights. The first and second guard halves are retained by the base such that they contact each other to fully cover a rotating shaft or coupler. A bottom of the first guard half 12 is preferably pivotally mounted to the pedestal 10, foundation 101, or machine with at least one hinge 16. A bottom of the second guard half 14 is also preferably pivotally mounted to the pedestal 10, foundation 101, or machine with at least one hinge 16. The hinge 16 may be a stationary or removable type. The first and second guard halves may also be retained by the pedestal 10, foundation 101, or machine with other methods besides hinges, such as latches, fasteners, and any other suitable attachment method. A first half sleeve 18 preferably extends outward from at least one end of the first guard half 12. A second half sleeve 20 preferably extends outward from at least one end of the second guard half 14. A first flange 22 preferably extends outward from at least one side of the first sleeve 18. A second flange 24 preferably extends outward from at least one side of the second sleeve 20. A first top flange 26 is preferably formed on a top of the first guard half 12 and a second top flange 28 is preferably formed on a top of the second guard half 14. The first and second guard halves are preferably fabricated from a high impact plastic. It is also preferable that the high impact plastic have a clear or translucent color to allow the shaft or coupling to be viewed without removing the guard halves. FIG. 5 shows a perspective view of a retention clip 30, bolt 32, and lock nut 34 which retain the first guard half 12 against the second guard half 14. The retention clip 30 is preferably used as a template for drilling a hole in the flanges 22, 24, 26, and 28. The retention clip 30 is placed over the flanges and the retention clip is retained in place with a bolt 32 and lock nut 34, or any suitable locking fastener. If a lock nut 34 or nonlocking fastener is not used, the nut may vibrate off the bolt allowing the retention clip 30 to also vibrate off the flanges. The retention clip 30 may be replaced with a latch, a lock, or any other suitable retention device which firmly retains the first guard half 12 against the second guard half 14.

Figure 6:
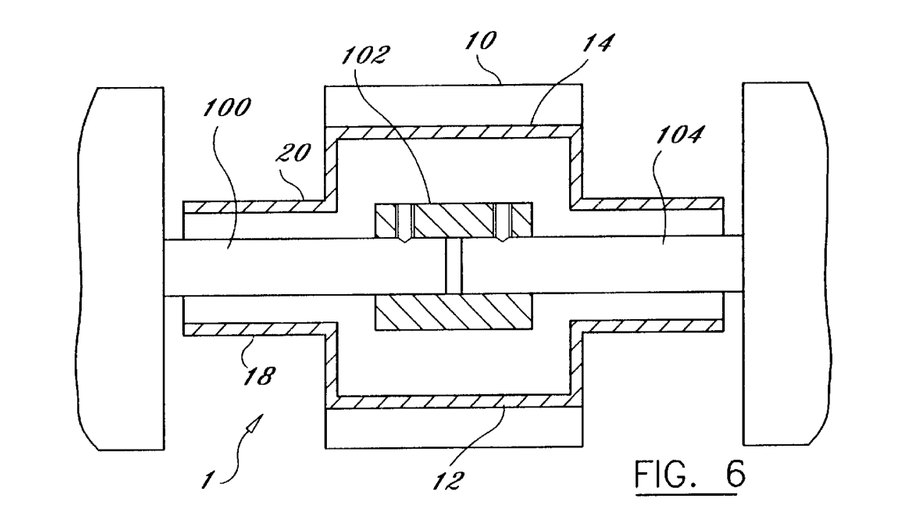
FIG. 6 is a top cut-away view of an adjustable rotating shaft guard with a pair of rotating shafts covered thereby in accordance with the present invention.

Front cutting lines 36 are preferably formed on a bottom front of the first and second guard halves. End cutting lines 38 are preferably formed on at least one bottom end of the first and second guard halves. Sleeve exterior ribs 40 are preferably formed on the first and second flanges. The cutting lines are preferably shallow depressions formed in the surface which act as a guide for cutting the first and second guard halves to reduce the height thereof for custom installation. The length of each sleeve may be reduced by cutting along the sleeve cutting lines 40. FIG. 6 shows a top cut-away view of the adjustable rotating shaft guard 1 covering a first rotating shaft 100 which is coupled to a second rotating shaft 104 through a rotary coupler 102.

The adjustable rotating shaft guard 1 may be installed in the following manner. The length of the rotating shafts to be covered are measured. The half sleeves are cut to the lengths needed to cover the rotating shafts. The height of the rotating shafts from a mounting surface is also measured. The bottoms of the first and second guard halves are cut to the heights required to center the rotating shafts within the first and second half sleeves.

Figure 7:
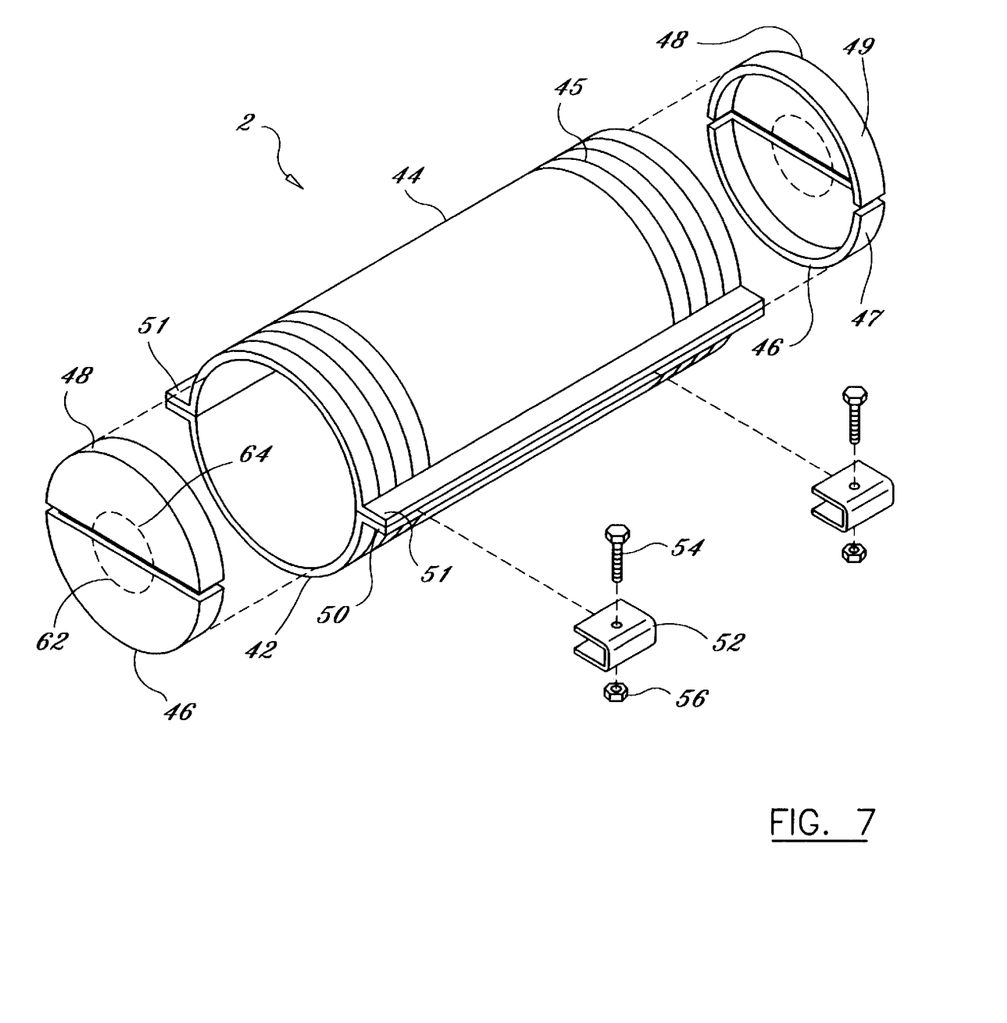
FIG. 7 is a exploded perspective view of a second embodiment of an adjustable rotating shaft guard in accordance with the present invention.
Figure 8:
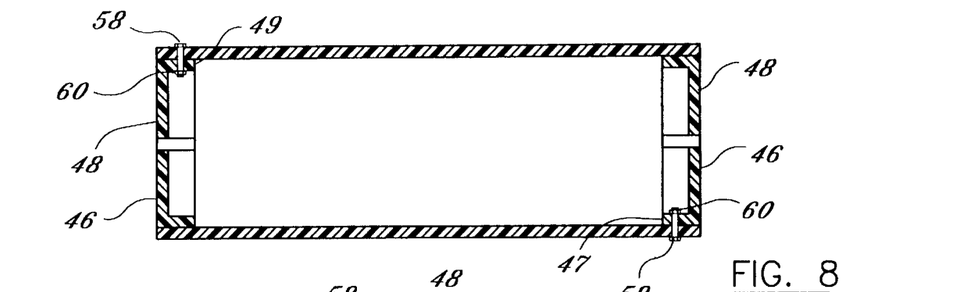
FIG. 8 is a side cross-sectional view of a first sleeve guard half in accordance with the present invention.
Figures 9, 10:
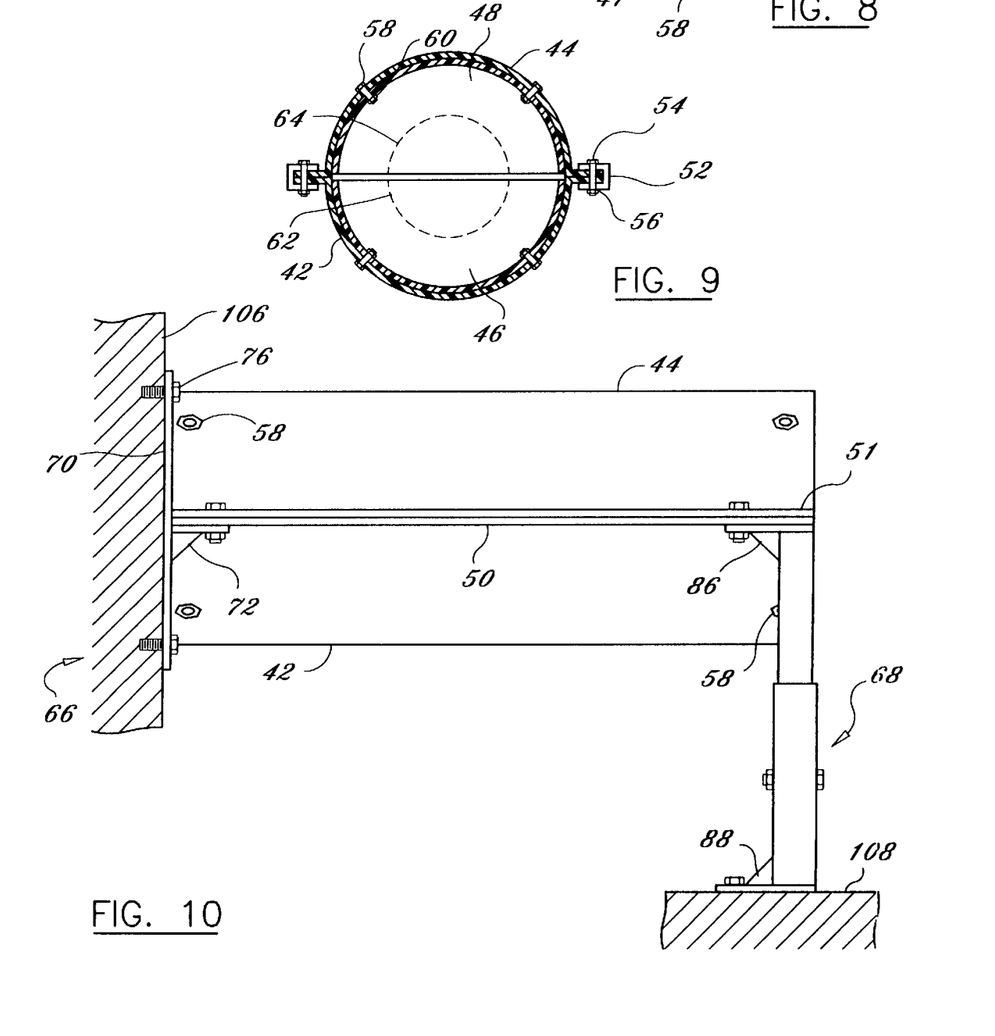
FIG. 9 is an cross-sectional view of a second embodiment of an adjustable rotating shaft guard in accordance with the present invention.
FIG. 10 is a side view of a second embodiment of an adjustable rotating shaft guard with a mounting plate and set of adjustable legs attached thereto in accordance with the present invention.

FIG. 7 shows a second embodiment of an adjustable rotating shaft guard 2 includes a first sleeve guard half 42, a second sleeve guard half 44 a first end cap half 46, and a second end cap half 48. A first flange 50 extends outward from each side of the first sleeve guard half 42. A second flange 51 extends outward from each side of the second sleeve guard half 44. The first and second flanges of the first and second sleeve guard halves are fastened against each other. The first and second flanges are preferably retained against each other with a plurality of retention clips 52, bolts 54, and lock nuts 56. The retention clip 52 may be replaced with a latch, a lock, or any other suitable retention device which firmly retains the first sleeve guard half 42 against the second sleeve guard half 44. A first end cap half 46 has a first peripheral flange 47 and a second end cap half 48 has a second peripheral flange 49. With reference to FIGS. 8 and 9, the first and second end cap halves are preferably retained in the first and second sleeve guard halves, respectively with a plurality of bolts 58 and lock nuts 60. A first semi-circle opening 62 is formed in the first end cap half and a second semi-circle opening 64 is formed in the second end cap half to provide clearance for a rotating shaft.

The first sleeve guard half 42, the second sleeve guard half 44, and the pair of end cap halves are preferably fabricated from a clear or translucent color high impact plastic to allow the shaft or coupling to be viewed without removing the guard halves. The ends of the first and second sleeve guard halves preferably have a plurality of cutting lines 45 which provide a reference for sawing to a specific length.

Figure 11:
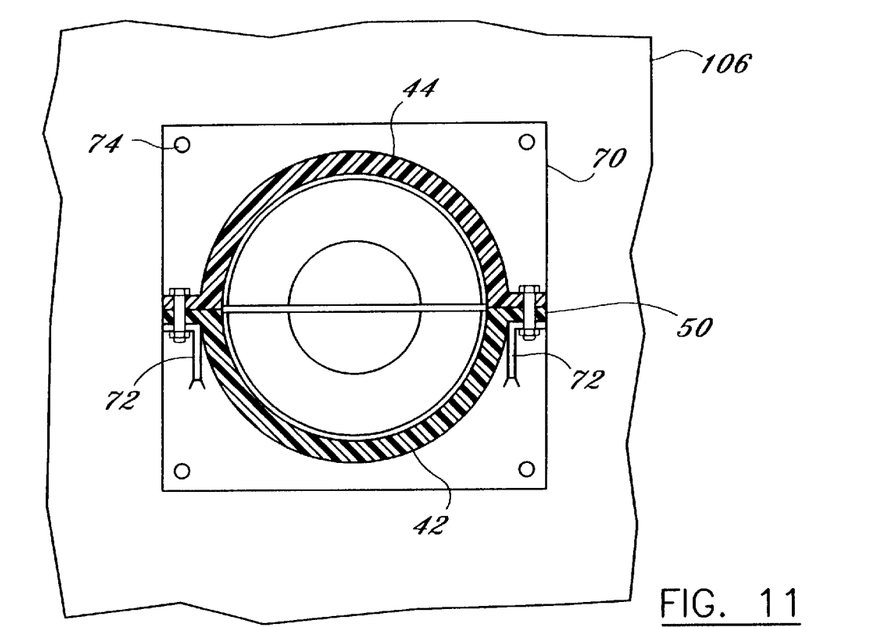
FIG. 11 is a cross-sectional view of a second embodiment of an adjustable rotating shaft guard with a mounting plate attached thereto in accordance with the present invention.
Figure 12:
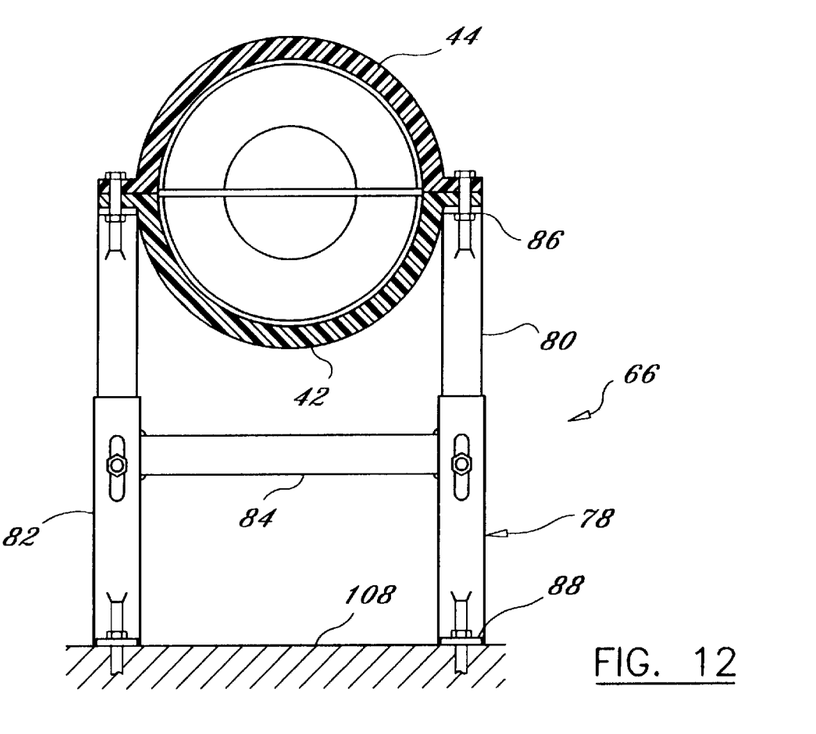
FIG. 12 is a cross-sectional view of a second embodiment of an adjustable rotating shaft guard with a set of adjustable legs attached thereto in accordance with the present invention.

With reference to FIG. 10–12, one or both ends of the first and second sleeve guard halves may be supported by a mounting plate 66. One or both ends of the first and second sleeve guard halves may also be supported by an adjustable leg set 68. The mounting plate 66 includes a fastening plate 70 and a pair of attachment brackets 72. A plurality of mounting holes 74 are formed in the fastening plate 70. A plurality of bolts 76 are preferably used to attach the adjustable rotating shaft guard 2 to a machine 106. At least one hole is formed in a top of each attachment bracket 72 such that the flange 50 may be bolted thereto.

The adjustable leg set 68 includes a female leg set 78 and a pair of male telescoping legs 80. The female leg set 78 includes a pair of female legs 82 which are attached to a cross member 84. A top mounting bracket 86 is attached to a top of each male telescoping leg 80. A hole is formed through the top mounting bracket 86 to allow thereof to be bolted to each flange 50. A bottom mounting bracket 88 is attached to a bottom of each female leg 82. A hole is formed through the bottom mounting bracket 88 to allow thereof to be bolted to a foundation 108. The female and male legs are preferably slotted to allow thereof to be adjusted relative to each other. A bolt or other fastener is used to tighten the female legs against the male legs to prevent unwanted vertical movement.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An adjustable rotating shaft guard capable of attachment to a mounting surface comprising:

a first guard half having an opening in each end thereof, said first guard half being adapted to be attached to the mounting surface;

a second guard half having an opening in each end thereof, said second guard half being adapted to be attached to the mounting surface, said first guard half mating to said second guard half such that said first and second guard halves are capable of covering at least one rotating shaft; and a plurality of cutting lines being formed on a front and at least one end of said first and second guard halves.

2. The adjustable rotating shaft guard capable of attachment to a mounting surface of claim 1, further comprising:

a first half sleeve extending from at least one end of said first guard half and a second half sleeve extending from at least one end of said second guard half.

3. The adjustable rotating shaft guard capable of attachment to a mounting surface of claim 2, wherein:

a first flange extending outward from at least one side of said first sleeve half and a second flange extending outward from at least one side of said second sleeve half.

4. The adjustable rotating shaft guard capable of attachment to a mounting surface of claim 2, further comprising:

a plurality of cutting lines being formed on said first and second sleeve halves.

5. The adjustable rotating shaft guard capable of attachment to a mounting surface of claim 1, wherein:

a bottom of said first guard half being adapted to be pivotally attached to the mounting surface and a bottom of said second guard half being adapted to be pivotally attached to the mounting surface.

6. The adjustable rotating shaft guard capable of attachment to a mounting surface of claim 1, wherein:

a first top flange extending from a top of said first guard half and a second top flange extending from a top of said second guard half.

7. The adjustable rotating shaft guard capable of attachment to a mounting surface of claim 1, further comprising:

at least one retention device being used to retain said first guard half against said second guard half.

8. The adjustable rotating shaft guard capable of attachment to a mounting surface of claim 1, further comprising:

said first and second guard halves being fabricated of clear or see-through plastic.

9. An adjustable rotating shaft guard capable of attachment to a mounting surface comprising:

a first guard half having a first half sleeve extending from at least one end thereof, said first guard half being adapted to be attached to the mounting surface;

a second guard half having a second half sleeve extending from at least one end thereof, said second guard half being adapted to be attached to the mounting surface, said first guard half mating to said second guard half such that said first and second guard halves are capable of covering at least one rotating shaft; and a plurality of cutting lines being formed on a front and at least one end of said first and second guard halves.

10. The adjustable rotating shaft guard capable of attachment to a mounting surface of claim 9, wherein:

a first flange extending outward from at least one side of said first sleeve half and a second flange extending outward from at least one side of said second sleeve half.

11. The adjustable rotating shaft guard capable of attachment to a mounting surface of claim 10, further comprising:

a plurality of cutting lines being formed on said first and second sleeve halves.

12. The adjustable rotating shaft guard capable of attachment to a mounting surface of claim 9, wherein:

a bottom of said first guard half being adapted to be pivotally attached to the mounting surface and a bottom of said second guard half being adapted to be pivotally attached to the mounting surface.

13. The adjustable rotating shaft guard capable of attachment to a mounting surface of claim 9, wherein:

a first top flange extending from a top of said first guard half and a second top flange extending from a top of said second guard half.

14. The adjustable rotating shaft guard capable of attachment to a mounting surface of claim 9, further comprising:

at least one retention device being used to retain said first guard half against said second guard half.

15. The adjustable rotating shaft guard capable of attachment to a mounting surface of claim 9, further comprising:

said first and second guard halves being fabricated of clear or see-through plastic.

16. An adjustable rotating shaft guard capable of attachment to a mounting surface comprising:

a first guard half having an opening in each end thereof, said first guard half being adapted to be attached to the mounting surface;

a second guard half having an opening in each end thereof, said second guard half being adapted to be attached to the mounting surface, said first guard half mating to said second guard half such that said first and second guard halves are capable of covering at least one rotating shaft; and a plurality of cutting lines being formed on a front and at least one end of said first and second guard halves;

a first top flange extending from a top of said first guard half and a second top flange extending from a top of said second guard half; and at least one retention device being placed over said first and second top flanges to retain said first and second guard halves against each other.

17. The adjustable rotating shaft guard capable of attachment to a mounting surface of claim 16, further comprising:

a first half sleeve extending from at least one end of said first guard half and a second half sleeve extending from at least one end of said second guard half.

18. The adjustable rotating shaft guard capable of attachment to a mounting surface of claim 17, wherein:

a first flange extending outward from at least one side of said first half sleeve and a second flange extending outward from at least one side of said second half sleeve.

19. The adjustable rotating shaft guard capable of attachment to a mounting surface of claim 17, further comprising:

a plurality of cutting lines being formed on said first and second half sleeves.

20. The adjustable rotating shaft guard capable of attachment to a mounting surface of claim 16, wherein:

a bottom of said first guard half being adapted to be pivotally attached to the mounting surface and a bottom of said second guard half being adapted to be pivotally attached to the mounting surface.

21. The adjustable rotating shaft guard capable of attachment to a mounting surface of claim 16, wherein:

said at least one retention device being at least one retention clip.

22. The adjustable rotating shaft guard capable of attachment to a mounting surface of claim 16, further comprising:

said first and second guard halves being fabricated of clear or see-through plastic.

23. An adjustable rotating shaft guard capable of attachment to a mounting surface comprising:

a first guard half having a first half sleeve extending from at least one end thereof, said first guard half being adapted to be attached to the mounting surface;

a second guard half having a second half sleeve extending from at least one end thereof, said second guard half being adapted to be attached to the mounting surface, said first guard half mating to said second guard half such that said first and second guard halves are capable of covering at least one rotating shaft;

a plurality of cutting lines being formed on a front and at least one end of said first and second guard halves;

a first top flange extending from a top of said first guard half and a second top flange extending from a top of said second guard half; and at least one retention device being placed over said first and second top flanges to retain said first and second guard halves against each other.

24. The adjustable rotating shaft guard capable of attachment to a mounting surface of claim 23, wherein:

a first flange extending outward from at least one side of said first half sleeve and a second flange extending outward from at least one side of said second half sleeve.

25. The adjustable rotating shaft guard capable of attachment to a mounting surface of claim 23, wherein:

a bottom of said first guard half being adapted to be pivotally attached to the mounting surface and a bottom of said second guard half being adapted to be pivotally attached to the mounting surface.

26. The adjustable rotating shaft guard capable of attachment to a mounting surface of claim 23, wherein:

said at least one retention device being at least one retention clip.

27. The adjustable rotating shaft guard capable of attachment to a mounting surface of claim 23, further comprising:

a plurality of cutting lines being formed on said first and second half sleeves.

28. The adjustable rotating shaft guard capable of attachment to a mounting surface of claim 23, further comprising:

said first and second guard halves being fabricated of clear or see-through plastic.

* * * * *